United States Patent Office
3,518,809
Patented July 7, 1970

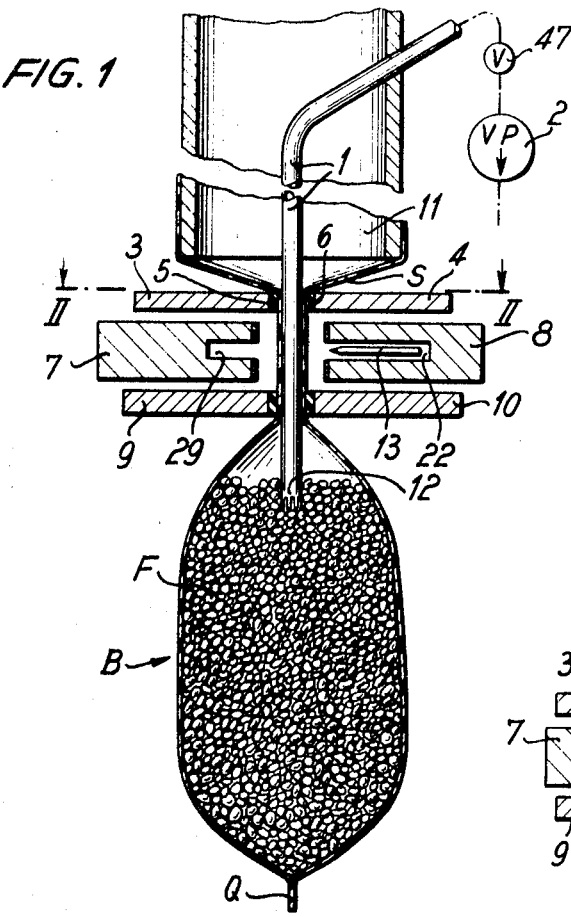
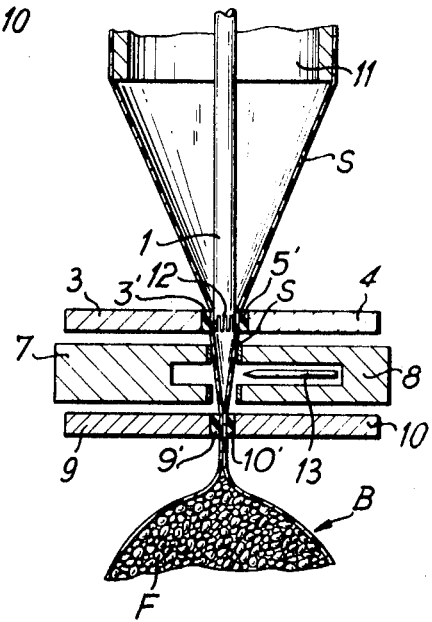
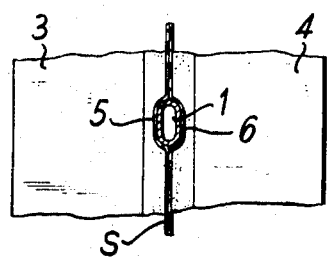
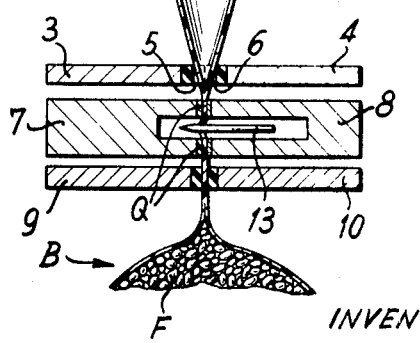

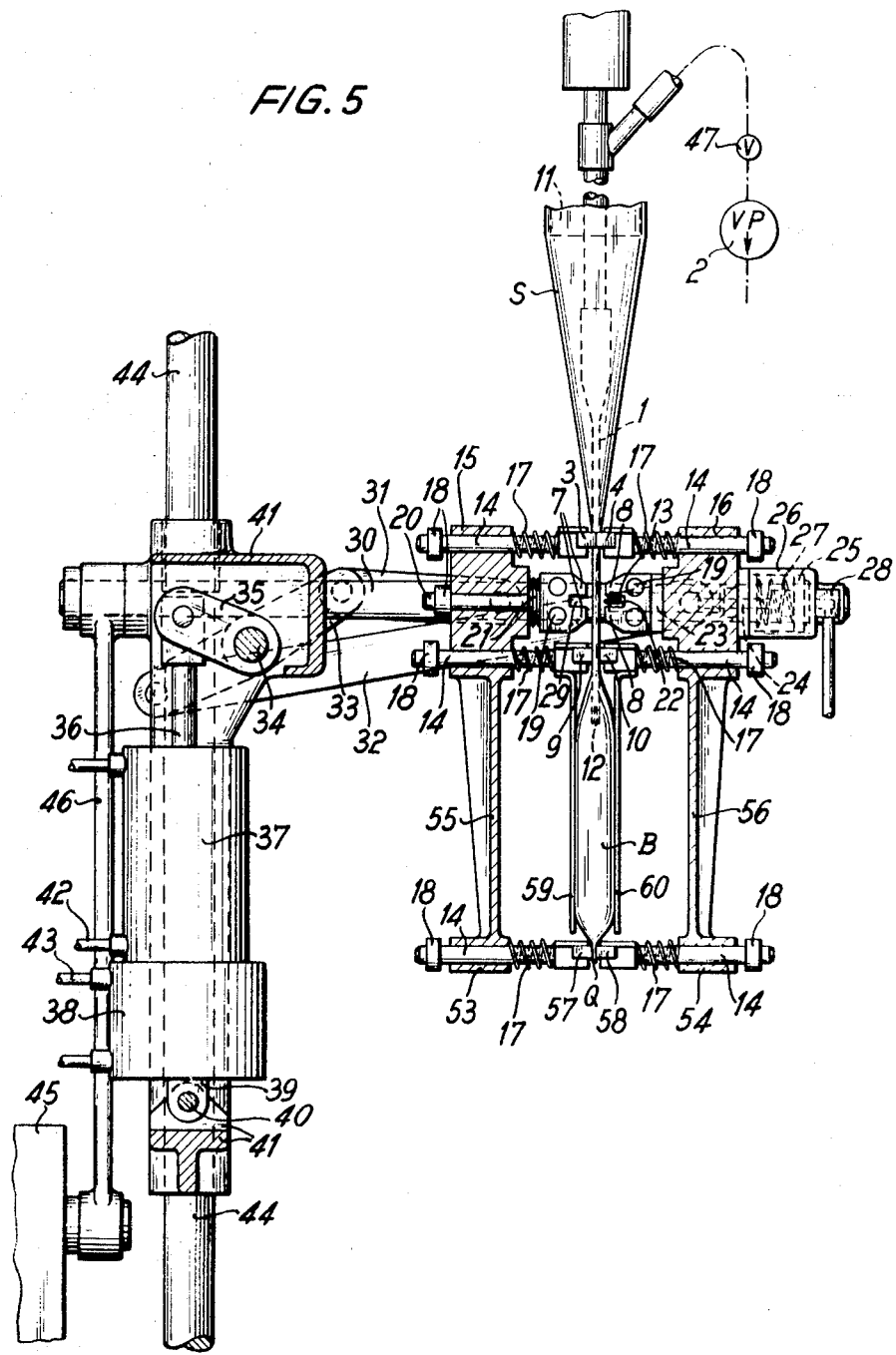

3,518,809
APPARATUS FOR MAKING AND FILLING BAGS
Helmut Ott, Hofingen, Kreis Leonberg, Germany, assignor to Fr. Hesser Maschinenfabrik, A.G., Stuttgart-Bad Cannstatt, Germany
Filed Feb. 7, 1968, Ser. No. 703,772
Int. Cl. B65b 31/06
U.S. Cl. 53—112      9 Claims

ABSTRACT OF THE DISCLOSURE

Apparatus for making, sealing and filling bags from a continuous web of packaging material in which the web is draped over a forming tube; two pairs of clamp jaws are disposed below the tube and a pair of seal jaws is interposed therebetween. An evacuating conduit extends through the tube into and between the jaws and protrudes into or closely adjacent to the top level of the fill good. Upon withdrawal of the conduit from the bag, the upper margins of the tubing are clamped, provided with two transverse seams and severed between the two seams to form the bag.

---

The invention relates generally to an apparatus for making, filling and sealing evacuated bags, filled with granular or similar material and formed from an endless web of packaging material.

In the prior art it is already known to fabricate gas tight bags, or similar containers, constructed from an endless web of heat seal responsive packaging material. In the conventional apparatus the top opening of the bag is sealed in two steps. The first seal is made while an avacuating conduit extends into the upper closing margins of the bag or container. The marginal walls are pressed against the conduit by means of clamp jaws while the rest of the opening is sealed. After the initial seal is accomplished and the air has been evacuated through the conduit, a second seal is made across the tube below the initial seal and below the conduit. The bags are formed from an endless heat seal responsive packaging material which is placed around a hollow tube for forming a tubular web which is sealed at the bottom, filled, evacuated and sealed as noted above and severed from the webbing on a continuous basis. An apparatus of this general type is disclosed in U.S. Pat. 2,145,941.

Systems of the type mentioned above operate without evacuating chambers and, therefore, labor under certain disadvantages. The capacity, as well as the degree of evacuation is limited since the evacuation of the air out of the tubular web causes the walls to collapse in front of the conduit opening, by adhering to each other and appreciably interfering with the egress of the air.

In order to avoid the above mentioned difficulties, the apparatus in accordance with this invention provides an aid evacuating conduit protruding directly into the tubular web, beyond the marginal closing portions, and with the conduit opening terminating either closely above the top level of the fill good or directly within the fill good.

More specifically, an aspect of the present invention resides in the provision of an apparatus for making, filling and sealing bags from a continuous tubular web of packing material in which the apparatus includes a hollow web forming a product filling tube and a pair of clamp jaws arranged below the tube and each thereof movable relative to each other and effective for transversely flattening the tubular web and for controlling the egrees and ingress of air into the web. A pair of transverse seal jaws is arranged below the aforementioned clamp jaws and each of the pair of seal jaws is movable relative to each other and transverse to the tube to provide an effective seal across the tubular web. An exacuating conduit extends within and beyond the forming and filling tube and between the pair of clamp jaws and between and below the seal jaws into the tubular web below the top margins thereof and either into or closely adjacent to the top level of the fill good.

Another aspect of the present invention resides in the provision of the above described apparatus for making, filling and sealing bags in which the pair of transverse seal jaws are provided with which two, vertically spaced, transversely extending sealing surfaces and wherein clamp jaws arranged below the sealing jaws are effective to release the air in the tubular web between the aforementioned sealing surfaces, into the evacuating conduit.

It is therefore the primary object of this invention to provide an apparatus of the type herein above described in which the disadvantages of prior art devices have been overcome.

It is another object of this invention to provide an apparatus for making, sealing and filling bags in which the evacuating conduit is arranged during the sealing and evacuating process in such a manner that the same will not impede the efficiency of the evacuating step and wherein seal and clamping jaws are arranged in such a manner so as to accommodate the position of the evacuating conduit.

For a better understanding of the present invention, together with other and further objects thereof, reference is had to the following description taken in connection with the accompanying drawings, and its scope will be pointed out in the appended claims.

In the drawings:

FIG. 1 is a generally achematic illustration and partly an elevational cross-section of an apparatus in accordance with this invention;

FIG. 2 is a cross-sectional view of the device shown in FIG. 1 taken along lines II—II;

FIG. 3 is a view similar to FIG. 1 illustrating a step in the fabrication of the bag just past the evacuation of the bag;

FIG. 4 is a view similar to FIG. 3 illustrating the seal step subsequent to the step shown in FIG. 3; and FIG. 5 is an elevational view, partly in cross-section, of the device shown in FIG. 1 together with the driving elements.

Referring now to the drawings, there is shown an apparatus for filling, evacuating and sealing bags B, fabricated from a tubular web S formed around hollow forming tube 11, in the conventional manner, out of an endless web of packaging material. The latter is sealed longitudinally (not shown) and the resulting tube S is drawn downward below the forming tube 11.

The apparatus of this invention includes a conduit 1 connected to a vacuum pump 2 with a control valve 47 being operably interposed therebetween. The conduit 1 extends concentrically into hollow forming tube 11 and a pair of clamp jaws 3, 4 are arranged just below the terminal end of the tube 11. The clamping faces 3′ and 5′ of the clamp jaws 3, 4, are resilient and each include a semi-circular recess 5 and 6, respectively, which is complementary to the configuration of the conduit 1 so that the clamps may fit snugly around the conduit, see FIG. 2. Below the clamp jaws 3, 4 are arranged, in suitable juxtaposition, a pair of transverse seal jaws 7, 8 and another pair of clamp jaws 9, 10 whose clamping surfaces are provided with a resilient clamping face 9′, 10′ respectively.

As shown in FIG. 5, the upper and the lower clamp jaws 3 and 9, respectively, are slidably secured to a supporting bracket 15 on the left-hand side (in the drawing) of conduit 1; and jaws 4 and 10 are slidably secured on the other side of conduit 1 by supporting bracket 16. Each of the jaws is mounted to a guide rod 14, at the forward end thereof, which in the case of jaws 3 and 9 slidably extend through support 15 and those connected to jaws 4 and 10 extend through support 16. The connecting rods 14 of the upper jaws 3 and 4 are coaxially arranged and are parallel to the corresponding rod connecting to the lower jaws 9, 10. Movement of the rods and the respective jaws towards the conduit 1 is restricted by an abutment flange 18 secured on each rod. A spring 17 is placed on each rod 14 between the support and the jaw to bias the latter towards clamping engagement with its pairing jaw. Consequently, the distance between the individual member of a pair of clamp jaws and the supports 15, 16 can be increased until the abutment flange 18 on rods 14 engages the support 15 (16) and prevents further movement.

The transverse seal jaws 7, 8 are heated by means of conventional heat cartridges 19 disposed within the jaws. The transverse seal jaw 7 is also slidably mounted onto the supporting bracket 15 by means of two guide rods 20, each of which is similarly equipped at one end thereof with an abutment flange 18 and is biased by disc springs 21, interposed between the support 15 and the jaw, in the direction of the second transverse seal jaw 8. The transverse seal jaw 8 is mounted stationary on the support 16 and has a groove 22, in the sealing surface, of sufficient space to receive therein a severing knife 13. The severing knife 13 is held by two rods 23 connecting to the ends of the knife which project beyond the transverse seal jaw 8. The rods 23, in turn, are each secured to a piston rod 24, each of which receives at the end opposite to the knife 13 a piston 25 slidably disposed in cylinders 26 whose axes are parallel to the guide rods 20. Each piston 25 is biased by means of springs 27 into an end position so that the severing knife 13 is drawn into the groove 22. A tubular extension 28 on hollow cylinder 26 connects to a source of air, or oil, under pressure which is introduced through the extension 28 to actuate the piston in the direction and against the force of the spring 27 to cause the severing knife 13 to be moved partly into groove 29 provided in transverse seal jaw 7.

The supports 15 and 16 are mounted for relative sliding movement on two guide rods 30 extending parallel to each other. The rods 30 are arranged horizontally and at right angle to the conduit 1 and the forming tube 11, and the supports 15 and 16 are moved by double arm levers 33 through connecting links 31, 32. Both ends of levers 33 are rotatably linked about a common lever axis with lever 35. The last mentioned lever 35 is, in turn, movably connected to the piston rod 36 of cylinder 37. The end of cylinder 37 opposite to that of the piston rod 36 of cylinder 37. The end of cylinder 37 opposite to that of the piston rod 36 is secured to cylinder 38 out of which protrudes a piston rod 39 supported by frame 41 and more directly by bolt 40 secured on the frame. The horizontal guide rods 30 are similarly supported by the lever axis 34 tiltingly mounted on the frame 41.

While the foregoing description, specifically refers to, or implies, the presence of two members 20, 25, 26, 30, 33 and 44, FIG. 5 shows only one-half of the apparatus which is generally symmetric about the vertical plane proximate to the conduit 1.

In operation, when air pressure is supplied through extension 42 into the cylinder 37, the piston rod 36 is raised into the upper end position. As a result, levers 33, 35, the links 31, 32 and the supports 15, 16 are brought close to each other so that the clamp jaws 3, 4 and 9, 10 are pressed transversely against the tube S under the bias of spring 17. The recesses 5, 6 of the clamp jaws 3, 4 engage the conduit 1 which projects into the tubular web S, in a manner so that the conduit and the web S are tightly clamped against each other.

Upon supplying air under pressure to the second cylinder 38, through extension 43, the cylinder is raised relative to the bolt 40. This causes the force of the spring 17 to be overcome and, in consequence, the transverse seal jaws 7 and 8 are pressed against the tube S and establish a seam Q across the tubular web S.

To facilitate the stepwise withdrawal of the tubular web S from the forming tube 11, the overall frame 41 which also supports the jaws 3, 4, 7, 8, 9 and 10, etc., is mounted on guide rods 44 extending parallel to the forming tube 11 so that the same can be raised and lowered. The frame 41 is, preferably, driven by a conventional crank drive 45 by means of a connecting rod 46.

After the tube S is closed at the bottom with a cross seam Q and withdrawn a predetermined length from the tube 11, the latter portion is filled through forming tube 11 with a predetermined quantity of fill good F.

The end of the evacuating conduit 1 has a screen or grill-like opening 12, which is placed either close to the top level of the fill good F or, in the case of granular goods, the opening 12 of conduit 1 may protrude into the fill goods F.

The air pressure in the cylinder 37 is then increased to cause the clamp jaws 3, 4 to flatten the tubular web S (except for the areas adjacent to recesses 5, 6) tight against conduit 1. Simultaneously the lower clamps 9, 10 are passed against the web S and the conduit 1 which encircles the tubular web S. The filled tubular section between seam Q and the clamping tools is then evacuated by actuating the pump 2 and the control valve 47 to cause a withdrawal of the air through the opening 12 of conduit 1. In the case of sufficiently granular fill material the conduit 1 protrudes into the fill good F otherwise terminates closely near the top level thereof and, consequently, the air which is to be evacuated takes a path through the fill good F and directly into the conduit, thereby preventing a collapse or adhesion of the bag container walls which impedes or prevents evacuation.

Once the evacuation cycle is essentially completed, the frame 41 is sufficiently lowered by the actuation of crank drive 45 to vertically space the clamps 9, 10 relative to conduit 1, see FIG. 2. The margins of the tubular web S are then pressed tightly together by spring biased clamps 9, 10 to prevent any further egress or ingress of air. A continuation of the downward movement of frame 41 and parts mounted thereon causes also the transverse seal jaws 7, 8 to be clear of and vertically spaced from the conduit 1. At this juncture the transverse seal jaws 7, 8 are actuated by applying additional air pressure into cylinder 38 to form, simultaneously, two closing seams Q across the tube S above the fill good F. The tubular web S is then severed between the two adjacent cross seams Q by causing the knife 13 to cut across the web, thereby establishing a single, completely filled and closed bag B and a new tubular section S having a closed end which is ready for the next filling, evacuation, sealing and withdrawal cycle.

The arrangement of the lower clamp jaws 9, 10, facilitates, when their clamping surfaces thereof are flat, the release of the air which may have been trapped from that part of the tubular web S having the two closely adjacent cross seams Q so that any folds that may have formed during the evacuation are straightened and the cross seams Q are even and securely tight.

In order to avoid that during evacuation the lower end of the filled tubular web S shrinks lengthwise and thereby damages the lower cross seam Q which may not as yet be sufficiently cooled and strengthened and could consequently spring a leak, another pair of clamp jaws 57, 58 is provided which grips the bottom cross seam. The clamp jaws 57, 58 are also slidably supported by means of guide rods 14 in the same manner as described above. he rods 14 are movably mounted on brackets 53, 54 extending downward, integrally, from supports 15, 16, respectively by means of connecting arms 55, 56. The spring 17 mounted on each rod 14 and between bracket 53 and jaw 57, and bracket 54 and jaw 58 to cause the jaws to be biased against each other. Between the clamp jaws 9, 10 and 57, 58 plates 59, 60 may be arranged in order to give the bag B a predetermined flat form plates 59, 60 may be suspended from and between jaws 9, 10 and 57, 58.

The preferred embodiment of the invention as herein above described utilizes only a vacuum system. However, in conjunction with the conduit 1 the system may also be used to post-fill the bags with an inert gas. Care must be taken however, so that only a controlled amount of the gas is admitted into the bag to cause the tubular walls above the clamp jaws 9 and 10 to move apart only gradually and to prevent the bag or any of the seams from bursting; particularly since the bag walls, under the influence of the vacuum, are pressed against each other.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

I claim:

1. In an apparatus for making, filling, evacuating and sealing bags from a continuous tubular web of packaging material, comprising: a hollow tubular web forming and product filling tube a first pair of clamp jaws arranged below said tube and movable relative to each other and effective for transversely flattening the tubular web and controlling the egress and ingress of air into said web; a pair of transverse seal jaws arranged below said clamp jaw and movable relative to each other and transverse to said tube for transversely and permanently sealing said web; and an evacuating conduit adapted for extending within and beyond said tube between said clamp jaws and between and below said seal jaws with the end opening of said conduit being at least in close proximity to the top level of the fill good; means for moving said clamp jaws, said seal jaws and said conduit relative to each other and parallel to the longitudinal axis of said tube; and a second pair of clamp jaws arranged below said seal jaws and effective for clamping the tubular web after evacuation thereof.

2. Apparatus according to claim 1, wherein the end of said conduit terminating into said tubular web is formed with a screen-like opening.

3. Apparatus according to claim 1, wherein the end of said conduit terminating into said tubular web is formed with a grill-like opening.

4. Apparatus according to claim 1, wherein said transverse seal jaws are provided with two vertically spaced, transversely extending sealing faces and wherein said second pair of clamp jaws are effective for releasing the air between said sealing faces into said evacuating conduit.

5. Apparatus according to claim 1, and a third pair of clamp jaws located remote from all of said other jaws in proximity to the normal position of the bottom seam of the tubular web and effective to secure the bottom seam during evacuation of said tubular web.

6. Apparatus according to claim 4, wherein in each jaw of said pair of said seal jaws in the area between said sealing faces are recessed, with the recessed area of each jaw facing each other; and knife means, for severing the tubular web segments, movably disposed within one of said recessed areas and effective to protrude into the adjacent recessed area to cut the tubular web into individual bags.

7. Apparatus according to claim 1, frame means, for supporting said jaws, mounted for moving said jaws in unison relative to said conduit.

8. Apparatus according to claim 7, wherein said frame means includes a support bracket and a rod movably supported thereon; one of said clamp jaws being connected to one end of said rod and spring means interposed between said rod and said last mentioned jaws for biasing the latter in the direction of said conduit.

9. Apparatus according to claim 8, and a third pair of clamp jaws located remote from all of said other jaws in proximity to the normal position of the bottom seal of the tubular web and effective to secure said bottom seam during evacuation of said tubular web; and wherein said frame includes a plurality of rods with each of said clamp jaws being connected to a separate rod.

References Cited

UNITED STATES PATENTS

| 2,145,941 | 2/1939 | Maxfield | 53—112 |
| 2,928,216 | 3/1960 | Orsini | 53—22 |

TRAVIS S. McGEHEE, Primary Examiner